Figure 1:
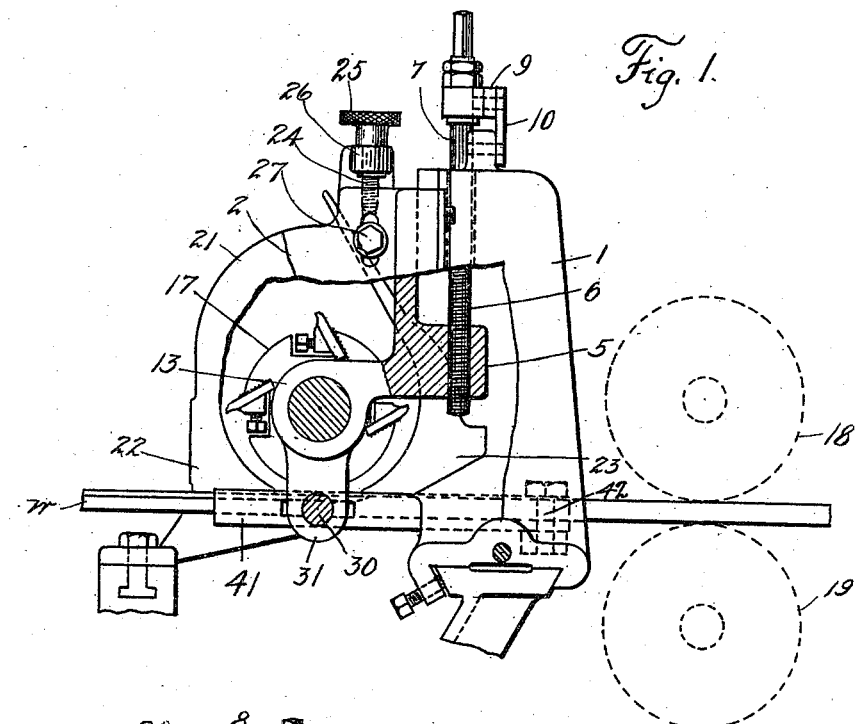

C. W. H. BLOOD.
BEADING MECHANISM FOR WOOD PLANERS.
APPLICATION FILED SEPT. 27, 1909.

989,480.

Patented Apr. 11, 1911.

2 SHEETS—SHEET 1.

Witnesses:
John E. Porter
Edward Maxwell

Inventor:—
Charles W. H. Blood.
by Geo. N. Maxwell,
Attorney.

C. W. H. BLOOD.
BEADING MECHANISM FOR WOOD PLANERS.
APPLICATION FILED SEPT. 27, 1909.
989,480.
Patented Apr. 11, 1911.
2 SHEETS—SHEET 2.
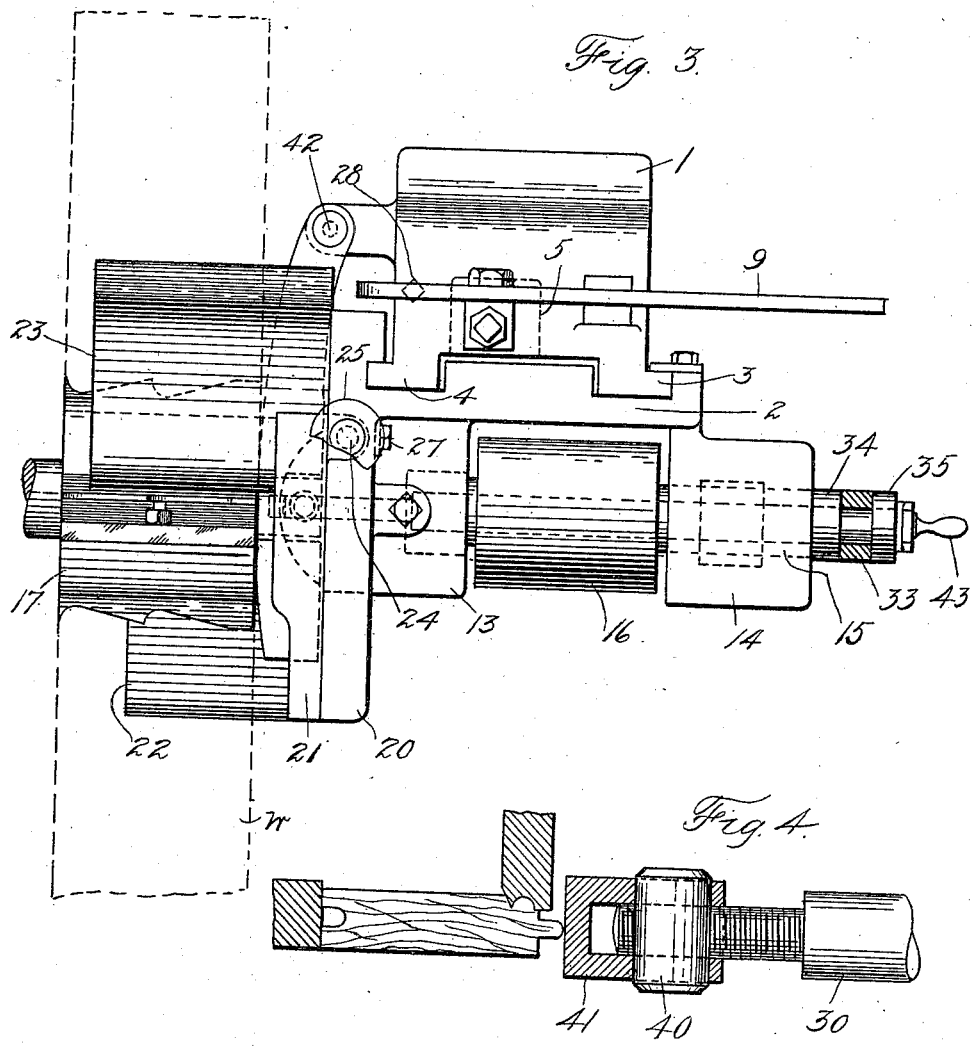

UNITED STATES PATENT OFFICE.

CHARLES W. H. BLOOD, OF BOSTON, MASSACHUSETTS, ASSIGNOR TO S. A. WOODS MACHINE COMPANY, OF BOSTON, MASSACHUSETTS.

BEADING MECHANISM FOR WOOD-PLANERS.

989,480.     Specification of Letters Patent.      Patented Apr. 11, 1911.

Application filed September 27, 1909. Serial No. 519,745.

*To all whom it may concern:*

Be it known that I, CHARLES W. H. BLOOD, a citizen of the United States, and resident of Boston, in the county of Suffolk and State of Massachusetts, have invented an Improvement in Beading Mechanism for Wood-Planers, of which the following description, in connection with the accompanying drawings, is a specification, like letters on the drawings representing like parts.

My invention relates to the manufacture of beaded stock, including novelty siding, and consists first of making the cutterhead and hold-down freely movable vertically to follow the unevennesses of the stock but fixed with relation to each other, so that when the cutters are properly adjusted to cut the desired depth below the hold-down device or devices they will remain so, and yet will rest by gravity on the stock, and, second, of giving the cutterhead a capability of longitudinal movement laterally of the stock under the control of the edge of the stock. In both features of my invention there is a profiling action whereby the depth of the beading is rendered uniform under the control of the hold-down, and the lateral position of the bead is maintained absolutely parallel to the edge of the stock under the control of a device bearing against the edge of the stock. The position of the cutter or cutterhead is controlled longitudinally from the edge of the stock itself in the same manner that the surface depth of the cut is controlled by the hold-down or shoe riding on the stock. Stock frequently comes crooked, and hence the main object of this profiling from the edge of the stock is, instead of endeavoring to straighten out the stock, to allow the stock to guide the cutter so that the beading will follow at or parallel to the edge of the stock, whereas if the beading were straight on crooked stock, the crookedness of the stock would be very noticeable and objectionable. In connection with the vertical movement of the cutterhead, provision is made for setting the cutters the predetermined depth below the hold-down or profiling shoes, and for then maintaining the cutterhead and shoes in position to rest freely on the work and yield away therefrom to any extra thickness of work which may come along, the result being that the depth of cut made by the beading cutter is always the same, being under the control at all times of the gravity shoes or hold-down devices. The hold-down may be in the form of a usual chip breaker, which, because it follows the profile or varying longitudinal surface of the board or work, I have termed a profiling shoe. If the operator changes the thickness or the board becomes irregular, there is no need of adjusting the cutter as the mechanism regulates itself. This feature of my invention constitutes, moreover, a safeguard against accident, as for instance if two boards should feed together or a sliver should come along, no disaster would result as the entire hold-down mechanism and cutterhead are vertically yielding; and the other feature of my invention eliminates the necessity of either straightening a piece of crooked stock or having the bead out of parallelism with the edge of the stock, this being accomplished simply by requiring the board to position the cutterhead.

The constructional details and further advantages of my invention will be pointed out more at length in the course of the following description, reference being had to the accompanying drawings, in which I have shown a preferred embodiment of the invention.

Figure 2:
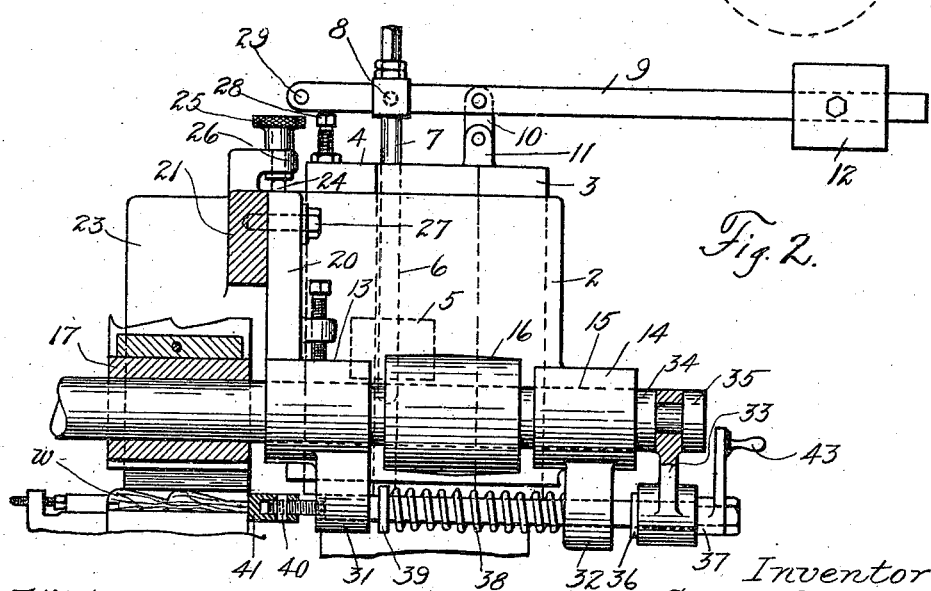

In the drawings, Figure 1 shows my invention in end elevation, looking at the side of the planer, parts being broken out and away for clearness of illustration; Fig. 2 is a longitudinal vertical sectional view showing the main features of the invention in front elevation; Fig. 3 is a top plan view thereof; and Fig. 4 is a view similar to Fig. 2 showing a different kind of beading cutter in place.

Mounted on the vertical front face of a suitable standard 1 extending up from the bed of the machine is a saddle or sliding frame 2 sliding on ways 3, 4, and provided with a relatively heavy boss or lug 5 having threaded engagement with the lower end 6 of a heavy supporting screw 7 pivotally connected at 8 to a lever 9 pivotally connected by a link 10 to an ear 11 at the top of the standard 1, said lever 9 being shown as provided with an adjustable counterbalance weight 12. The saddle 2 carries projecting journal bearings 13, 14 in which the cutterhead shaft 15 is journaled, provided with a belt pulley 16 and with the cutterhead proper 17, beneath which the work w is fed by usual feeding mechanism, feed rolls 18, 19 being conventionally indicated. The saddle 2 is provided at its inner end with a laterally projecting support 20 against whose inner face is adjustably secured the upright or vertical yoke portion 21 of the controlling device or cutterhead-positioning mechanism, herein shown (for the vertical movement) as a hold-down, comprising a front shoe 22 and a rear shoe 23, which also constitute the chip breaker. An adjusting bolt 24 operated by a hand nut 25 is mounted to turn, but not to move, longitudinally in an ear 26 projecting from the yoke 21 to overhang the adjacent part 20 of the saddle, into which it is threaded for adjusting the hold-down shoes up and down with relation to the cutter, said yoke, when adjusted, being clamped steady by any suitable means as by a bolt 27. An adjustable stud 28 engages the projecting end of the lever 9 to limit the downward movement of the cutterhead and hold-down mechanism so as to prevent the cutters from coming in contact with the bed of the machine in the absence of work. I have shown the weight lever 9 mounted for narrow or light stock, in which case the weight of the cutterhead and shoes would ordinarily be too great and would tend to crush or injure the work. For very wide or heavy stock, on the contrary, the pressure should be increased, and hence I have made the lever 9 reversible, and have provided a pivot hole 29 to be mounted on the link 10 so that the lever and its weight would extend in the opposite direction from that shown, and would thereby apply additional weight to the cutterhead and hold-down mechanism instead of decreasing the weight thereof as herein shown. The cutterhead shaft is free to move slightly longitudinally in its bearings 13, 14 under the control of a rod or shaft 30 mounted in brackets 31, 32 and connected to said shaft 15 by a short rigid arm 33. The shaft 15 is free to turn in the upper end of this arm but compelled to move longitudinally with said arm, which, for this purpose, is mounted in the annularly recessed end of the shaft 15 between adjacent shoulders 34, 35, said arm 33 being similarly mounted at its lower end on the rod 30 between fixed shoulders 36, 37, said rod being normally held toward the work by a spring 38 bearing against the bracket 32 at one end and against a collar 39 at its opposite end. Said rod is connected at its inner end by a nut 40 to a controlling device or cutterhead-positioning mechanism, herein shown (for the horizontal movement) as a horizontally movable shoe 41 pivoted at 42 to any suitable stationary part, as to the standard 1, and projecting thence forwardly in proper position to bear against the edge of the board or other work being planed, at a point directly beneath the cutterhead 17.

Preferably the rod 30 is threaded in the nut 40 and is provided with a handle 43 so that the profiling shoe 41 may be adjusted horizontally with relation to the cutters of the cutterhead.

In operation, the hold-downs or vertical profiling shoes 22, 23 are adjusted with relation to the cutterhead so that the cutters of the latter are set for cutting the predetermined depth below the bearing edges of said shoes. The screw 6 is turned so as to adjust the entire mechanism approximately to the work which is to be beaded or planed by the cutterhead 17. As the work is fed through the planer, the cutters of the cutterhead 17 cut to a uniform depth irrespective of variations in thickness of the work, as the cutterhead occupies a fixed relation with the shoes 22, 23. As said shoes bear continuously on the work and rise and fall with variations in thickness thereof, they carry with them the cutterhead, which therefore maintains an absolutely uniform cutting relation to the surface of the board. The shoes 22, 23 of the hold-down and the cutterhead 17 and its shaft 15 and the saddle 2 are always free to rise and fall, being supported on the vertical guides 3, 4 and held yieldingly under uniform pressure on the work this pressure being determined by the position of weight 12 carried by the lever 9 pivoted at 8 on the centrally arranged sliding rod 7. This eliminates all possibility of accident in case the operator should inadvertently permit two boards to get into the machine together, or in case the board should splinter, or for any other reason tend to carry an undue thickness along under the hold-down and beading cutterhead. At the same time the horizontal profiling shoe 41 accomplishes the same object with relation to the edge of the work that the vertical profiling shoes accomplish with relation to the sides of the work, so that if a board which is being beaded, is crooked, the shoe 41 bears against the crooked edge and correspondingly moves the cutterhead 17 and its shaft 15 horizontally so that the beading of the board is at the same distance from the edge throughout the entire length of the board, notwithstanding its lack of straightness. As the edge of the board varies in straightness, the shoe 41 is correspondingly moved thereby out or in, shifting the rod 30 lengthwise and thereby correspondingly shifting the cutter shaft 15 lengthwise, by means of the frame 33, so that the cutterhead is maintained at an absolutely unvarying distance from the edge of the work. The advantage of this will be more apparent from Fig. 4, where I have shown a piece of stock being beaded close to one edge, in which case it will be apparent that under ordinary circumstances it would be necessary to straighten the stock out by forcing it to the fixed guide, as otherwise the beading would not follow close to the edge of the board at crooked places, which would be very objectionable and noticeable.

My invention eliminates the necessity of straightening the stock out, simply by allowing the board itself to position the cutterhead.

It will be understood that I am not limited to the constructional details of the preferred embodiment of my invention herein set forth excepting as otherwise required by the claims.

Having described my invention, what I claim as new and desire to secure by Letters Patent is:—

1. In a planing machine, the hereindescribed beading mechanism, comprising a yieldably mounted cutterhead, and a chip breaker mounted in an operative plane of said cutterhead and connected to constitute a controlling device for said cutterhead whereby said cutterhead and controlling device may follow unevenness in contour of the work as the latter is fed through the machine.

2. In a planing machine, the hereindescribed beading mechanism, comprising a cutterhead and a mounting therefor, guided to yield freely to unevenness in the work as the latter is fed through the machine, a chip breaker mounted in an operative plane of said cutterhead connected to constitute a controlling device for said cutterhead, and means for maintaining said cutterhead and controlling device in continuous yielding pressure against the work.

3. In a planing machine, the herein described beading mechanism, comprising a cutterhead, a mounting therefor guided for yielding vertical movement, and a chip breaker formed as a depending shoe carried by said mounting in the plane of action of said cutterhead and adapted to rest upon the work to control the position of said cutterhead.

4. In a planing machine, the herein described beading mechanism, comprising a cutterhead, a mounting therefor guided for yielding vertical movement, a chip breaker formed as a depending shoe carried by said mounting in the plane of action of said cutterhead and adapted to rest upon the work to control the position of said cutterhead, and means for vertically adjusting said chip breaker relative to the cutterhead.

5. In a planing machine, the herein described beading mechanism, comprising a cutterhead, a mounting therefor guided for vertical movement, a chip breaker formed as a depending shoe carried by said mounting in the plane of action of said cutterhead and adapted to rest upon the work to control the position of said cutterhead, and a common means for variably and interchangeably weighing down or counterbalancing said vertically movable parts.

6. In a planing machine, the combination of a cutterhead, a mounting therefor guided for vertical movement, a depending shoe carried by said mounting to rest upon the work and control the position of said cutterhead, and means for variably weighing down or counterbalancing said parts, comprising a weighted lever connected to said mounting and constructed for a fulcrum connection at opposite sides of said mounting connection.

7. In a planing machine, the herein described beading mechanism, comprising a rotary cutterhead having peripheral cutting edges, a mounting therefor, a shoe mounted to slide lengthwise of said cutterhead axis with provision to yieldably engage an edge of the work, and a connection from said shoe to said cutterhead to directly control the movement thereof.

8. In a planing machine, the herein described beading mechanism, comprising a rotary cutterhead, a driving shaft therefor having a mounting permitting small endwise movement, a shoe mounted for slidable movement endwise of said cutterhead shaft, means for yieldingly holding said shoe against an edge of the work, and a connection from said shoe to said cutterhead shaft to control the position of said cutterhead.

9. In a planing machine, the herein described beading mechanism, comprising a cutterhead, a mounting therefor guided to slide vertically, a depending chip breaker carried by said mounting in the plane of action of the cutterhead and adapted to rest on the top surface of the work to control the vertical position of said cutterhead, said cutterhead disposed in said mounting for small transverse movement, a shoe slidably carried by said mounting in position to engage an edge of the work and having provision to be yieldably pressed thereagainst, and a connection from said shoe to said cutterhead to directly control the transverse position thereof.

In testimony whereof, I have signed my name to this specification, in the presence of two subscribing witnesses.

CHARLES W. H. BLOOD.

Witnesses:
WILLIAM D. VIVARTTAS,
EDWARD MAXWELL.